Figure 3:
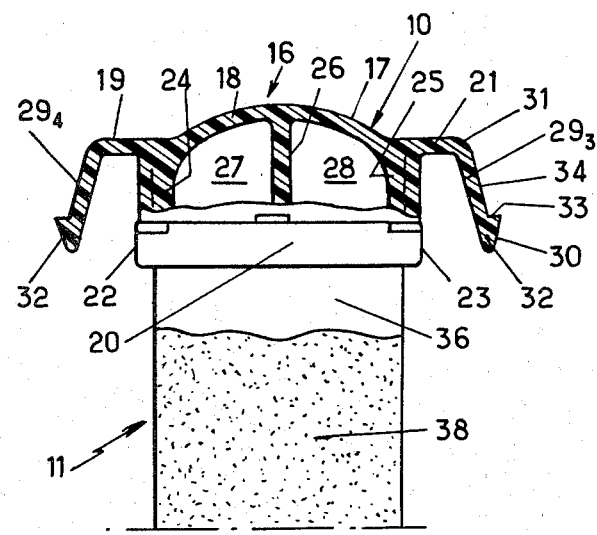

United States Patent [19]

Bouvot

[11] 4,328,859

[45] May 11, 1982

[54] MOUNTING DEVICE FOR A HEAT EXCHANGER IN THE CASING OF A HEATING, VENTILATION AND/OR AIR CONDITIONING APPARATUS, PARTICULARLY FOR THE PASSENGER SPACE OF A MOTOR VEHICLE, AND AN EXCHANGER PROVIDED WITH SUCH A DEVICE

[75] Inventor: Jean-François Bouvot, Le Mesnil-St-Denis, France

[73] Assignee: Societe Anonyme Francaise Du Ferodo, Paris, France

[21] Appl. No.: 102,863

[22] Filed: Dec. 12, 1979

[30] Foreign Application Priority Data

Dec. 22, 1978 [FR] France .............................. 78 36166

[51] Int. Cl.³ .......................................... F28F 9/00
[52] U.S. Cl. ................................. 165/78; 165/149
[58] Field of Search ................ 165/67, 78, 149, 76

[56] References Cited

U.S. PATENT DOCUMENTS

| | | | |
|---|---|---|---|
| 1,795,045 | 3/1931 | Rundlett | 165/68 |
| 2,506,051 | 5/1950 | Young | 165/67 |
| 3,894,580 | 7/1975 | Chartet | 165/67 |
| 4,036,288 | 7/1977 | Neveux | 165/149 |
| 4,196,774 | 4/1980 | Hoffmann | 165/67 |

FOREIGN PATENT DOCUMENTS

| | | | |
|---|---|---|---|
| 2353405 | 4/1975 | Fed. Rep. of Germany | 165/173 |
| 1967052 | 11/1976 | Fed. Rep. of Germany | 165/67 |
| 2703528 | 8/1978 | Fed. Rep. of Germany | 165/76 |
| 2249300 | 5/1975 | France | 165/67 |
| 2336653 | 7/1977 | France | 165/67 |
| 497144 | 8/1954 | Italy | 165/149 |

Primary Examiner—Sheldon J. Richter
Attorney, Agent, or Firm—Staas & Halsey

[57] ABSTRACT

A mounting device for a heat exchanger in the housing of an air conditioning and/or ventilation apparatus.

A heat exchanger element comprises means for its being hooked to the casing so that the simple introduction of the exchanger in the housing provides at the end of the movement the fixation of the exchanger which is hooked to the casing.

The invention is particularly applicable to air conditioning apparatuses for the passenger space of a motor vehicle.

13 Claims, 7 Drawing Figures

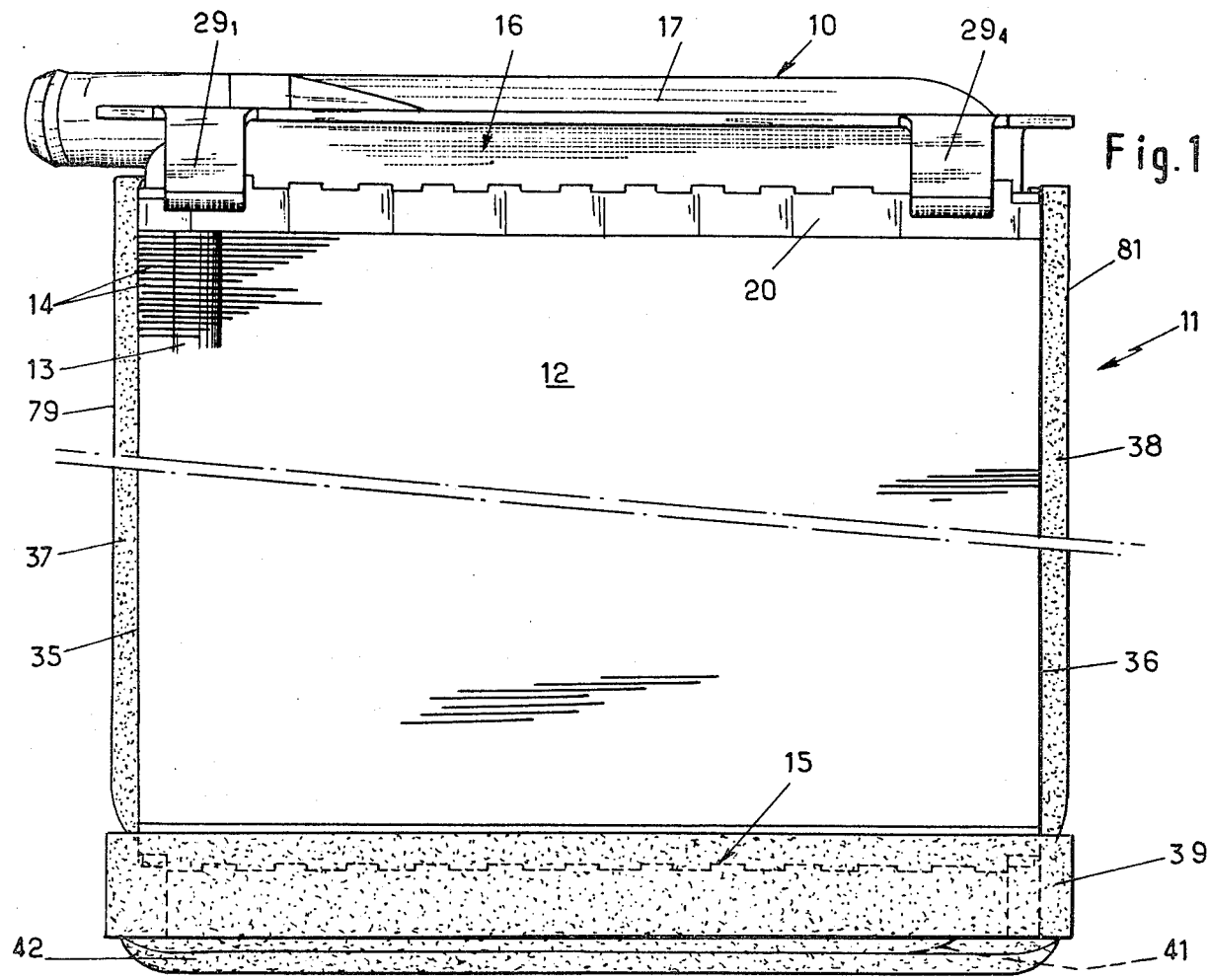

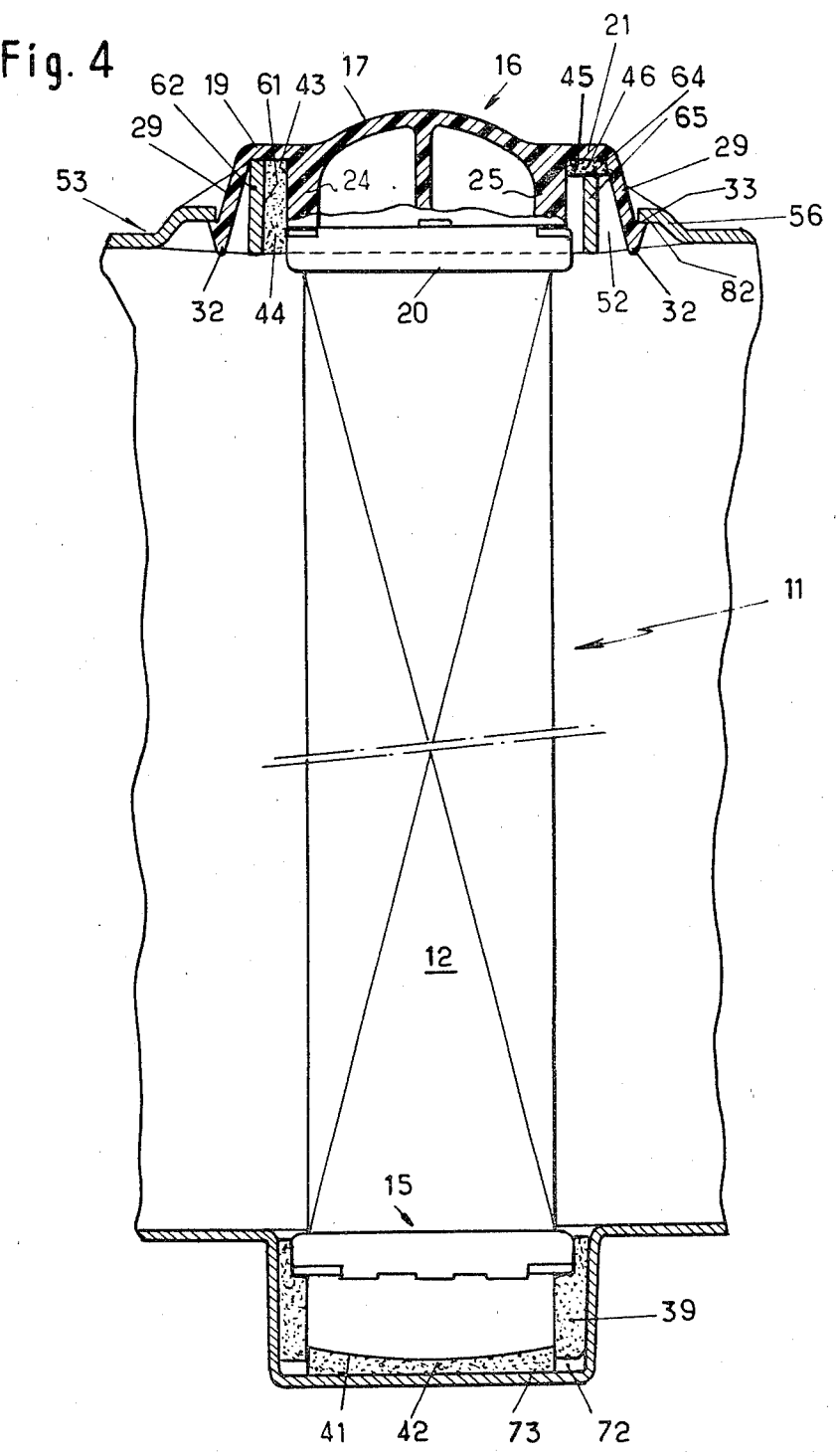

ced the positioning by force fit, for instance in the manner of a drawer, of the heat exchanger through the opening provided to this effect in the heating apparatus ensures, at the end of the travel length, which is preferably rectilinear, by hooking, the immobilization of the exchanger in its position of operation, wherein said opening is closed, the hooking maintaining advantageousy in compression bands foreseen for providing a tight assembly.

MOUNTING DEVICE FOR A HEAT EXCHANGER IN THE CASING OF A HEATING, VENTILATION AND/OR AIR CONDITIONING APPARATUS, PARTICULARLY FOR THE PASSENGER SPACE OF A MOTOR VEHICLE, AND AN EXCHANGER PROVIDED WITH SUCH A DEVICE

The object of the invention is a mounting and fixation device for a heat exchanger in the casing of a heating, ventilation and/or air conditioning apparatus, particularly for the passenger space of a motor vehicle, and an exchanger provided with such a device.

It is known that it is desirable to easily mount o disassemble a heat exchanger in or from the heating, ventilation and/or air conditioning apparatus of which it forms a part, and this for example for placing it in position and eventually replacing it.

In the case of an air conditioning apparatus, or air conditioner, or similar, the exchanger is inside a casing or housing in which flows the air to be heated.

In some apparatuses, the positioning is carried out by assembling, around the exchanger, elements constituent of the casing. The replacement of the exchanger requires therefore a general disasembling of the unit.

In other apparatuses, the exchanger is held inside the casing by screws. The mounting is relatively lengthy and the risk of unscrewing is avoided oly by using screw brakes, thereby causing extra costs.

The object of the invention is a mounting device of an exchanger in air conditioning apparatus, or similar, which is of simple construction and provides better results than the known devices.

According to the invention, the positioning by force fit, for instance in the manner of a drawer, of the heat exchanger through the opening provided to this effect in the heating apparatus ensures, at the end of the travel length, which is preferably rectilinear, by hooking, the immobilization of the exchanger in its position of operation, wherein said opening is closed, the hooking maintaining advantageousy in compression bands foreseen for providing a tight assembly.

According to one embodiment, an element of the heat exchanger is provided with resilient lugs adapted for cooperating by a simple hooking with a casing wall having a shape adapted for such a cooperation.

Preferably, said resilient lugs are integral with a water box which a heat exchanger usually comprises.

According to a mode of execution, the hooking means has several degrees allowing to maintain the tightness in spite of size differences arising from the manufacture or from a prolonged usage.

Figure 7:
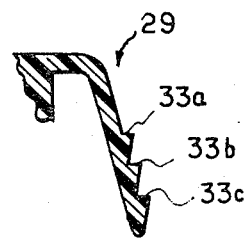
Figure 2:
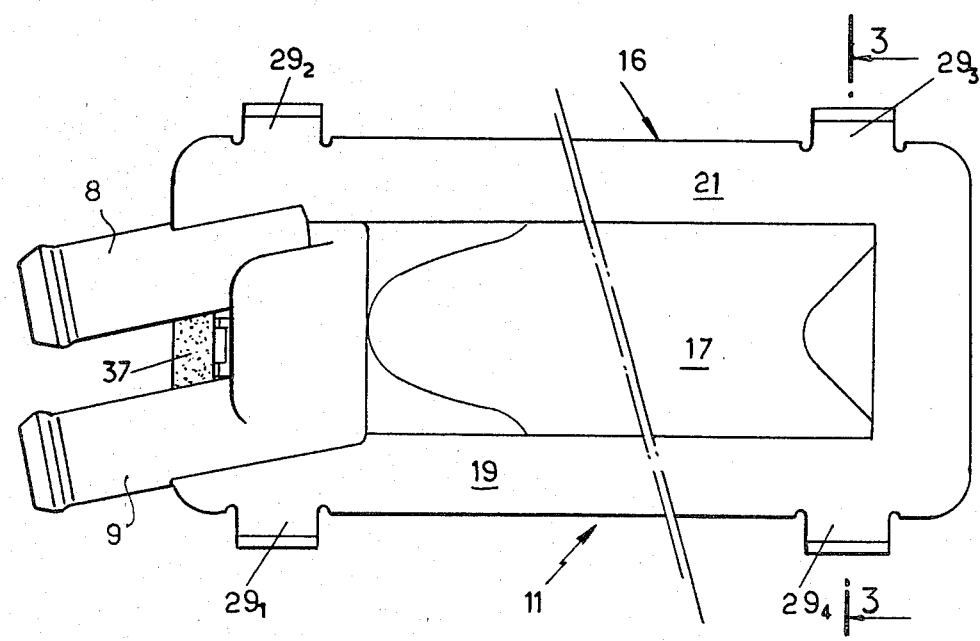
Figure 5:
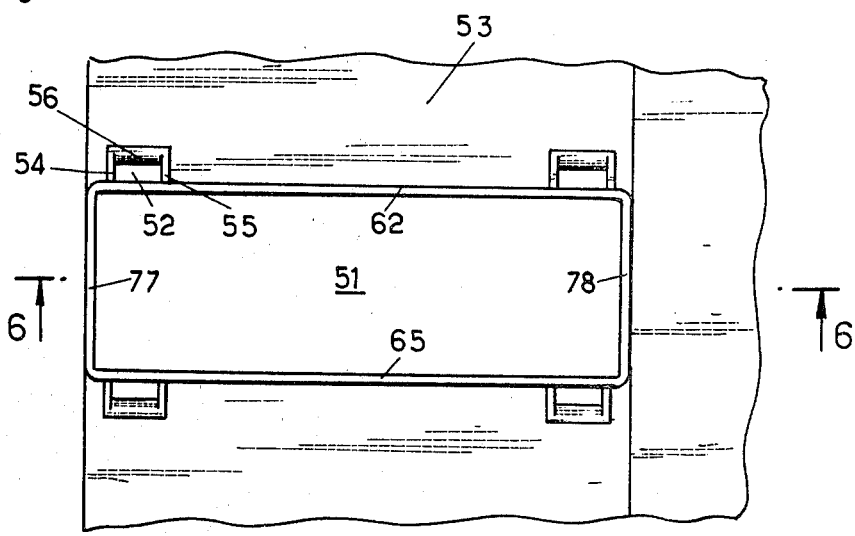
Figure 6:
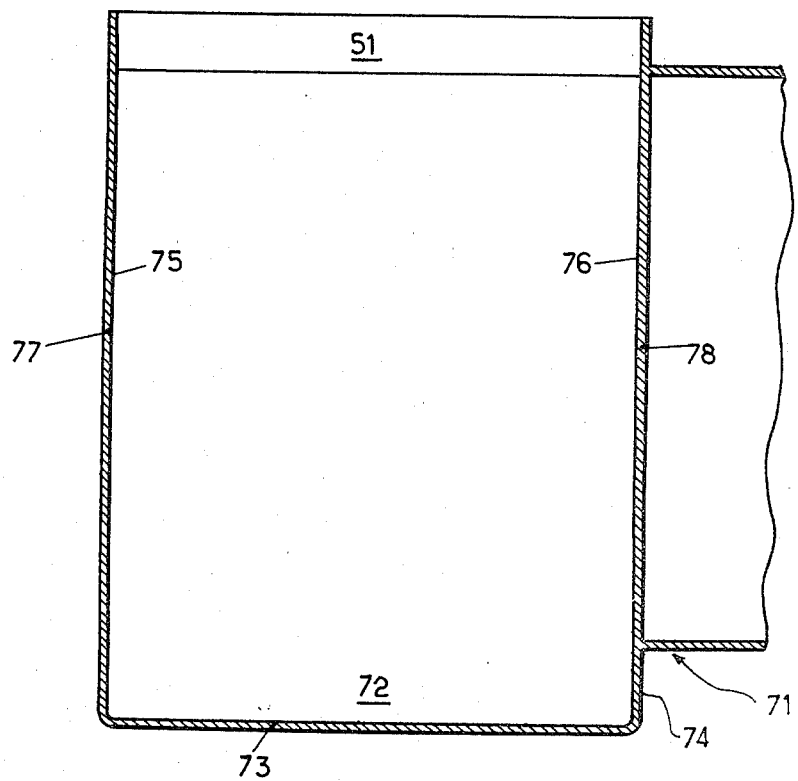

In the following description, which is given by way of example, reference is made to the accompanying drawings wherein:

FIG. 1 is an elevation view of a heat exchanger according to the invention;
FIG. 2 is a top view therof;
FIG. 3 is a sectional view along line 3—3 of FIG. 2;
FIG. 4 is a sectional view of a heat exchanger mounted in a casing, some elements being omitted for the clarity of the drawing.
FIG. 5 is a plan view of a casing for receiving a heat exchanger;
FIG. 6 is a sectional view along line 6—6 of FIG. 5; and
FIG. 7 is a sectional view of a lug with hooks foreseen for an embodiment.

The heat exchanger 11, the general shape of which is that of a rectangle parallelepipedal block (FIG. 1 and 2) is comprised of a body 12 formed by a nest of parallel tubes 13 provided with grills 14, the tubes being foreseen for the flow of water between a first water box 15 and a second water box 16 or vice versa.

The water box 16 from which depend connecting adapters 8 and 9 to the hot water circuit, comprises a cover 10, advantageously made of a synthetic material, with an upper bottom 17, a central portion 18 convex outwardly (FIG. 3) continued by two marginal sections 19 and 21 protruding outside a rectangle limited by the turned over edges 22 and 23 of a collector or hollowed plate 20, advantageously of metal, through which extend tightly the ends of the tubes, said edges being adapted for the assembly of the collector 20 with the cover 10 through the edges 24 and 25 of the latter, the assembly along the perpendicular sides being similar. From the bottom 17 of the cover 10 depends a wall 26 which devides the water box into two compartments 27 and 28.

From the marginal sectional 19 and 21 depend, in the vincinity of the tops of the water box cover 16, and along the longer sides of said cover, lugs $29_1$, $29_2$, $29_3$, $29_4$, (FIG. 2) which extend away from edges 24 and 25 from their fixation 31 to said marginal sectional to their hook-shaped ends 32. Said ends are also formed with a shoulder 33 connecting the outer face 34 of lug 29 with the outer face 30 of hook 32.

The smaller faces 35 and 36 of the parallelepipedal body 12 of the exchanger are coated with a band of resiliently compressible foam material, respectively 37 and 38.

The water box 15 (FIG. 4), comprising also a cover assembled with a hollowed plate, is coated on the side surfaces of the cover with a belt 39 made of a resiliently compressible flexible foam material and the bottom of cover 41, which is without margin, is coated with a sheet 42 also made of a resiliently compressible foam material.

In an embodiment such as is shown in the left hand side portion of FIG. 4, the outer face 43 of the edge 24 of the water box 16 is coated with a band 44 made of a resiliently compressible flexible foam material adapted for cooperating with the inner face 61 of an edge 62 (FIG. 5) of casing 53 of the heating and ventilation apparatus.

In the embodiment shown in the right hand side portion of FIG. 4, which could replace the embodiment just described, it is the inner face 45 of the marginal section 21 which is coated with a band 46 made of a resiliently compressible flexible foam material adapted for cooperating with the outer portion 64 of an edge 65.

Said edges 62 or 65 bound an opening 51 of rectangular configuration (FIG. 5), but said opening can also have other geometrical configurations according to the design of the exchanger.

Windows 52 are foreseen in the connecting region between said edges and the casing body 53 and are bound by ribs 54 and 55, opposite edge 62 or 65, by an up-turned edge 56 (FIG. 4 and 5).

Opposite opening 51 (FIG. 6), the casing wall 71 is shaped according to a well 72 bound by a bottom 73 and a side wall 74.

For positioning the heat exchanger in the heating apparatus, one simply presents it by its end which comprises the water box 15 without adapters opposite opening 51 and fits it inside the casing. The movement is guided by the engagement of bands 37 and 38 with faces 75 and 76 of walls 77 and 78 which are part of the casing. At the end of the movement, the end of the heat exchanger 11 comprising the water box 15 extends inside the well 72 and by the end of the driving in movement, the peripheral band 39 of the water box 15 engages the side wall 74 of well 72 and the coating 42 covering the water box cover engages the well bottom 73.

The outer faces 79 and 81 (FIG. 1) of the longitudinal bands 37 and 38 are compressingly bearing against the housing walls 77 and 78 (FIG. 4).

The hooked fixation is provided by engagement of shoulders 33 of the lugs 29 with the lower faces 82 of the up-turned edges 56 bordering the window 52. Since the lugs 29 have been flexed owing to their resiliency proper and due to the engagement of the ridges of said up-turned edges 56 and the lugs 29, they abruptly snap back to their initial position when the shoulders 33 of the hooks 32 pass beyond said up-turned edges.

In the embodiment shown in the left hand side portion of FIG. 4, the tightness at the level of the water box 16 is provided by engagement of the peripheral band 44 surrounding the water box with the edges 62 and 65.

In the embodiment shown in the right hand side of FIG. 4, the tightness is provided by the band 46 which coats the inner face 45 of the marginal section 21 being crushed against ridge 64 of edges 65 and 62.

There is no need for providing further tightness means for the circuit of the air flowing across the heat exchanger.

The removal of the exchanger, when necessary, is provided simply by flexing lugs 29 with the hand so as to release the hooks 32 relative to the up-turned edges 56 which border the windows 52.

In an embodiment such as is shown in FIG. 7, a lug 29 is formed at its end with several hooking shoulders 33a, 33b, 33c, three in number in the example, each of which is adapted for cooperation with the lower face 82 of an upturned edge 56. Thus, without modification, one can ensure the assembly and/or disassembly in a casing of a ventilation apparatus, of heat exchangers of different heights, or take in account the assembly tolerances and/or a prolonged period of use.

I claim:

1. A device for mounting and fixing a heat exchanger in a casing of a ventilation apparatus for an automotive vehicle, said heat exchanger having a water box at one end, wherein said water box is formed with resilient lugs adapted to cooperate by hooking with stationary parts of the casing at the end of the introduction of the heat exchanger inside the casing.

2. A device as claimed in claim 1, wherein the casing comprises, on one of its faces, an opening through which is introduced the exchanger, in the manner of a drawer.

3. A device as claimed in claim 1, wherein the water box is made of a plastic material and the resilient lugs form an integral unit with a cover of said water box.

4. A device as claimed in claim 3, wherein the water box cover has a rectangular cross section and comprises four hooking resilient lugs near the apexes of the water box cover and at the ends of the longer sides of said cover.

5. A device as claimed in claim 4, wherein the hooking lugs are positioned at some lateral distance from the cover edges and are connected to the cover via marginal sections.

6. A device as claimed in claim 5, wherein an introduction opening of the casing is bounded by a protruding edge adapted for cooperating by abutment with the said marginal sections of the resilient lugs and the casing further comprises up-turned edges spaced away from the protruding edge for cooperating by hooking with the ends of the resilient lugs.

7. A device as claimed in claim 6, wherein the tightness is provided by a resiliently compressible band pressed between the protruding edge of the casing and a marginal section of the water box cover.

8. A device as claimed in claim 1, wherein the hooking lugs are formed with a plurality of shoulders distributed over their length.

9. A device as claimed in claim 1, wherein the hooking lugs are flexible at their fixation portion, providing the immobilization by a snapped-in engagement.

10. A device as claimed in claim 1, wherein a resiliently compressible band completes the tightness between the water box and the edges of the casing.

11. A device as claimed in claim 10, wherein the band is pressed between an edge of the casing and the water box.

12. A device according to claim 1, wherein the heat exchanger comprises another water box opposite to that provided with said resilient hooking lugs, said another water box being housed in a well of the casing and resilient sealing bands being interposed between the another water box and the walls of the well.

13. A mounting and fixation device for a heat exchanger in a casing or housing of an air conditioning and/or ventilation device of the passenger space of a motor vehicle, wherein one element of the heat exchanger comprises means for its hooking into the casing so that by the simple introduction of the exchanger inside the casing, there is obtained at the end of the movement the fixation of the exchanger which is hooked to the casing, said means comprising a hook formed with a plurality of shoulders distributed over its length.

* * * * *